United States Patent [19]
Maki

[11] 3,890,906
[45] June 24, 1975

[54] LINEAR SYNCHRONOUS MOTOR FOR MAGNETICALLY LEVITATED VEHICLE

[75] Inventor: Naoki Maki, Naka, Japan

[73] Assignee: Hitachi, Ltd., Japan

[22] Filed: Mar. 27, 1973

[21] Appl. No.: 345,475

[30] Foreign Application Priority Data
Mar. 28, 1972 Japan............................ 47-31005

[52] U.S. Cl...................... 104/148 SS; 104/148 MS
[51] Int. Cl............................................ B61b 13/08
[58] Field of Search. 104/148 MS, 148 SS, 148 LM; 310/12, 13

[56] References Cited
UNITED STATES PATENTS

| | | | |
|---|---|---|---|
| 3,158,765 | 11/1964 | Polgreen ...................... | 104/148 MS |
| 3,768,417 | 10/1973 | Thornton et al............... | 104/148.55 |

Primary Examiner—M. Henson Wood, Jr.
Assistant Examiner—Reinhard J. Eisenzopf
Attorney, Agent, or Firm—Craig & Antonelli

[57] ABSTRACT

The linear synchronous motor under consideration is used for propelling a magnetically levitated vehicle along a track, the field coils of the motor being carried on the vehicle while the driving coils are disposed along the track. During running of the vehicle, it is possible that a vibration may occur due to attraction and repulsion between the driving and field coils, thereby impairing smooth and stable running of the vehicle. In order to reduce the abovementioned vibration, the dimensions of the driving and field coils and the average distance between the driving and field coils are chosen so that a specific correlation is maintained between them.

11 Claims, 12 Drawing Figures

LINEAR SYNCHRONOUS MOTOR FOR MAGNETICALLY LEVITATED VEHICLE

This invention relates to a linear synchronous motor, particularly to an arrangement of the field coils and the driving coils of such a motor.

In the conventional vehicles which have wheels rotated by a driving motor, propulsion of the vehicle is effected by the aid of the adhesive force between the wheels and rails or ground. However, the adhesive force is not fully effective for vehicles which run at such a high speed as 300 km/hr. or more. In order to solve this problem, different propelling systems have been developed, according to which a vehicle is levitated or suspended above ground and driven without the aid of the adhesive force between wheels and ground. A linear motor is suitably used for such a non-adhesive driving system. As well known, a linear motor is an electric motor which is linearly spread along a track, either one of the armature or the field part of the motor being mounted on the levitated vehicle and the remaining part being disposed along the track.

In order to suspend the vehicle in the air, it is common practice to mount magnetizing coils on the vehicle for producing a magnetic field and to dispose an array of short-circuited coils on the ground. With this arrangement, when the vehicle runs over and along the array of the ground coils, the travelling magnetic field interlinks with the ground coils, thereby inducing electric current in the latter coils. The thus induced current produces another magnetic field which reacts to the first magnetic field to establish a repulsive force between the vehicle coils and the ground coils, which suspends the vehicle above the ground.

However, the mere suspension of the vehicle above the ground is not sufficient for any practical operation. Some guide means must be provided along the track to keep the vehicle on the course. One of known systems proposed for this purpose is to provide another set of magnetizing coils on the vehicle and an array of the short-circuited coils on the ground for furnishing an electro-magnetic force in the lateral direction to keep the running vehicle on the course. The operating principle of such guidance is substantially similar to the above-described magnetic suspension.

In this connection, it has been already proposed to utilize the magnetizing coils for either suspending or guiding the vehicle also for the field coils of the driving linear motor. It is preferable for such a linear motor to be a linear synchronous motor which corresponds in the operating principle to the ordinary or rotary synchronous motor. Though a linear induction motor is operable in principle, this is inferior to the former in efficiency as well as in power factor and many problems must be solved before the linear induction motor can be of any practical use.

This invention will be described hereunder in comparison with the prior art and with reference to the accompanying drawings, in which.

Figure 8:
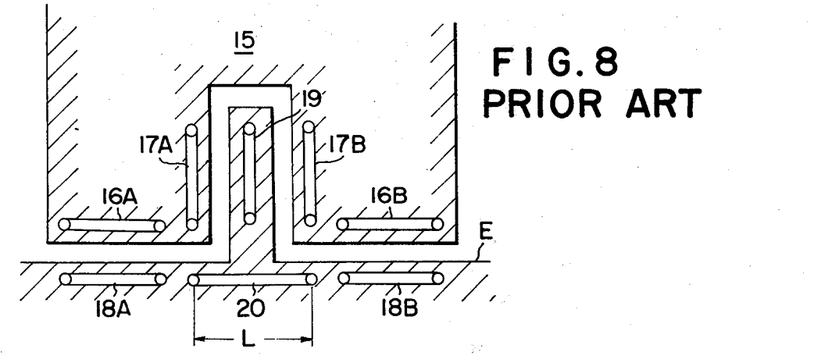
FIG. 8 is a diagram showing the arrangement of coils in the known suspending and driving system by linear synchronous motor.

Firstly referring to FIG. 8 which shows the coil arrangement in the known suspending and driving system using a linear syschronous motor, two pairs of field coils 16A, 16B and 17A, 17B are mounted at the bottom part of a vehicle 15, coils 16A and 16B being disposed at side portions of the vehicle 15 and opposite to ground, while coils 17A and 17B are positioned near the center of the vehicle with the planes thereof perpendicular to the plane of coils 16A and 16B. On ground side, suspending coils 18A and 18B are disposed opposite to field coils 16A and 16B respectively. Further, a guiding coil is supported vertically on the ground so as to be positioned between field coils 17A and 17B. Suspending coils 18A and 18B are a guiding coil 19 are short-circuited coils, or they may be conductive sheets. A driving coil 20 of the linear synchronous motor is disposed between suspending coils 18A and 18B. The width L or the lateral dimension of driving coil 20 is made to correspond to the distance between field coils 17A and 17B. Driving coil 20 is rectangular and energized from an ac power source to produce a travelling wave of magnetic flux depending on the velocity of the running vehicle. Vehicle 15 is propelled by a driving force resulting from the interaction between the travelling magnetic wave and the magnetic field by coils 17A and 17B. Further, the running of vehicle 15 induces a magnetic repulsion respectively between field coils 16A, 16B and suspending coils 18A, 18B and between field coils 17A, 17B and a guiding coil 19 to thereby lift the vehicle above the ground and confine it stably on the track.

Figure 9:
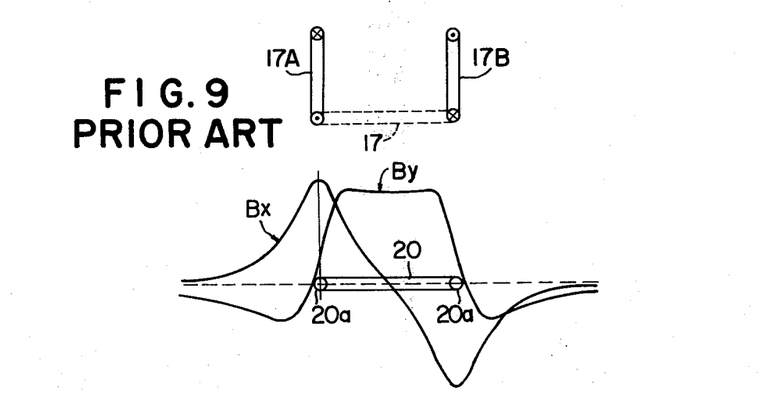
FIG. 9 is a diagram showing the distribution of the magnetic flux in relation to the arrangement of coils shown in FIG. 8.

FIG. 9 shows the distribution of the horizontal component $B_x$ and the vertical component $B_y$ of the density of the magnetic flux produced by field coils 17A and 17B at the position of driving coil 20. In FIG. 9, though the shape and position of field coils 17A and 17B do not correspond to those of driving coil 20, it should be noted that there exists a virtual coil 17 as shown in dashed line in FIG. 9 which corresponds to driving coil 20. As is seen from FIG. 9, horizontal flux density $B_x$ is the highest at opposite sides 20a of driving coil 20. This intense magnetic field flux reacts to the current flowing through sides 20a of the driving coil and produces attraction and repulsion within the linear motor to thereby cause a vertical vibration which is harmful to the suspending function of the magnetic system. Further, at the position of sides 20a of the driving coil, the vertical flux density $B_y$ has a steep gradient in relation to the lateral displacement. Therefore, the horizontal spring constant which is given as the product of the current flowing through coil side 20a and the gradient of the flux density $B_y$, has a large but unstable value at the position of the sides 20a, thereby impairing the lateral stability of the vehicle.

In this specification, the term "spring constant" means a magnetic force required for laterally displacing vehicle 15 from the center position thereof or replacing the same to the center position, while a force which compels the vehicle to be displaced is referred to as an "unstable spring constant" and a force which acts to restore the center position is referred to as a "stable spring constant."

Figure 10:
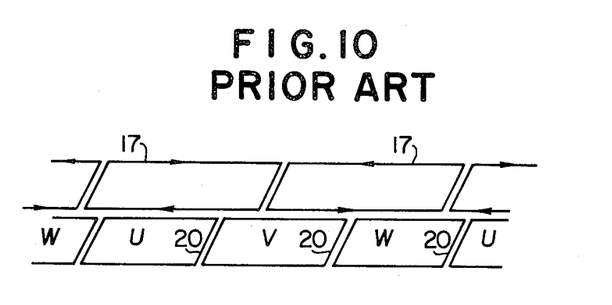
FIG. 10 is a diagram showing the positional relation of the driving coils to the field coils in the known linear synchronous motor shown in FIG. 8.

Referring to FIG. 10 which shows the positional relation of the driving coils to the field coils in the arrangement shown in FIGS. 8 and 9, driving coils 20 are positioned with a pitch corresponding to the electric angle of 120° in relation to the longitudinal continuous magnetic field generated by field coils 17. Driving coils 20 are connected to an ac power source respectively through switching means such as thyristors (not shown) which distribute current to the respective driving coils in proper sequence and at proper switching interval depending on the running speed of the vehicle.

Figure 11:
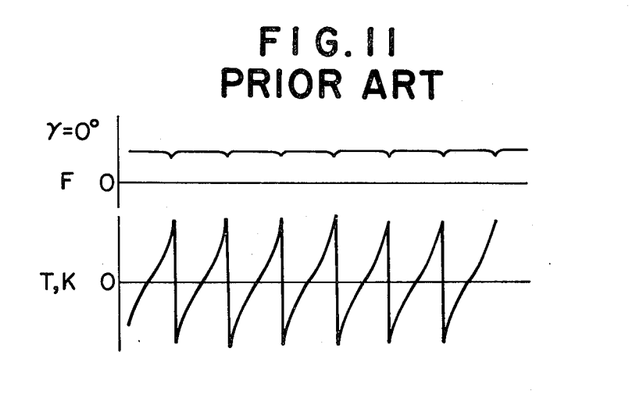
FIGS. 11 and 12 are graphs showing variations of driving force, vertical force and lateral spring constant acting to the vehicle along the track in the known system shown in FIGS. 8 to 10.
Figure 12:
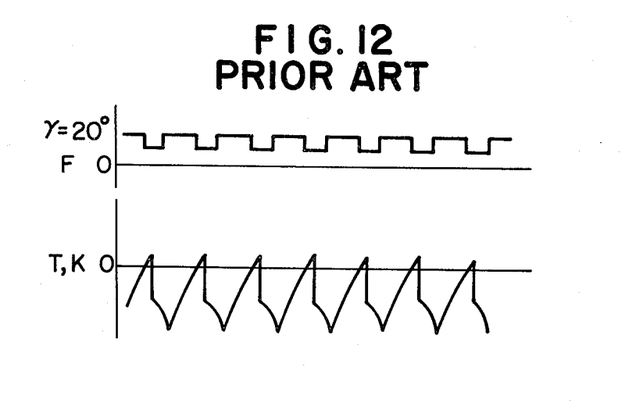

FIGS. 11 and 12 show variations of driving force F, vertical force T and lateral spring constant K acting to the vehicle as the vehicle runs along the track, FIG. 11 being for the case where the advance angle $\gamma$ for the control of thyristors to the induced voltage is zero and FIG. 12 being for the advance angle of 20°. As is clear from FIGS. 11 and 12, the respective maximum values of the vertical force and the lateral spring constant, which are detrimental for a stable running of the vehicle, are considerably large as compared with the driving force, and moreover, the variation patterns of the former forces are repetitive or oscillatory. Therefore, with the known coil arrangement, it is very difficult to achieve a stable running of the vehicle. In this connection, it is seen that the operation with the advance angle of 20° gives less driving force with more unstable spring constant as compared with the zero advanced angle operation. However, it should be noted that in so far as the problem of magnetic suspension is concerned, the former operation with 20 degrees of control advance is more advantageous, as the vertical force is repulsive in said operation. It may be possible even that the magnetic field acting on the driving coil is of some help for lifting the vehicle, by properly choosing the advance angle. Anyway, such a coil arrangement as shown in FIG. 8 cannot be practically used unless some measures are taken to reduce the great vibrating component of the vertical force and the lateral spring constant.

An object of this invention is to provide a linear synchronous motor for a magnetically levitated vehicle, in which the ineffective vertical force acting on the vehicle is reduced.

Another object of this invention is to provide a linear synchronous motor for a magnetically levitated vehicle, in which the ineffective component of the lateral spring constant acting on the vehicle is reduced.

A further object of this invention is to provide a linear synchronous motor for a magnetically levitated vehicle, in which the lateral spring constant acting on the vehicle is a stable constant.

A still further object of this invention is to provide a linear synchronous motor for a magnetically levitated vehicle, in which the reduction of the ineffective vertical force and the acquirement of the stable spring constant are achieved at the same time.

In order to achieve the above objects, the linear synchronous motor of this invention comprises a pair of field coils mounted on a magnetically levitated vehicle and a driving coil disposed on the ground, the widths of the field and driving coils and the average distance between the field and driving coils being chosen so that a specific correlation is maintained therebetween.

Hereunder, this invention is described in detail in connection with embodiments of the invention.

Figure 1:
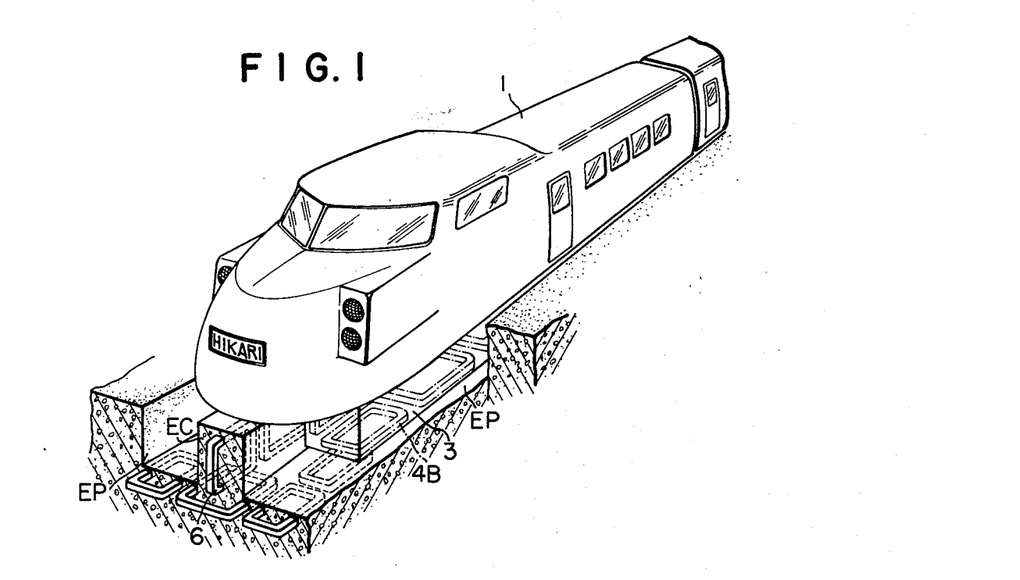
FIG. 1 is a perspective view of a magnetically levitated vehicle driven by the linear synchronous motor of this invention, also showing an arrangement of coils on the vehicle and the track.
Figure 2:
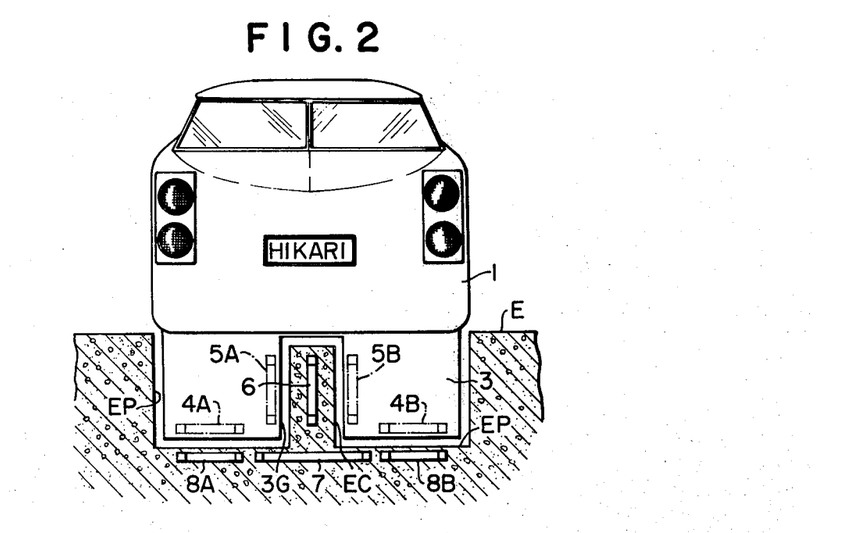
FIG. 2 is a front view of the same vehicle and track.
Figure 3:
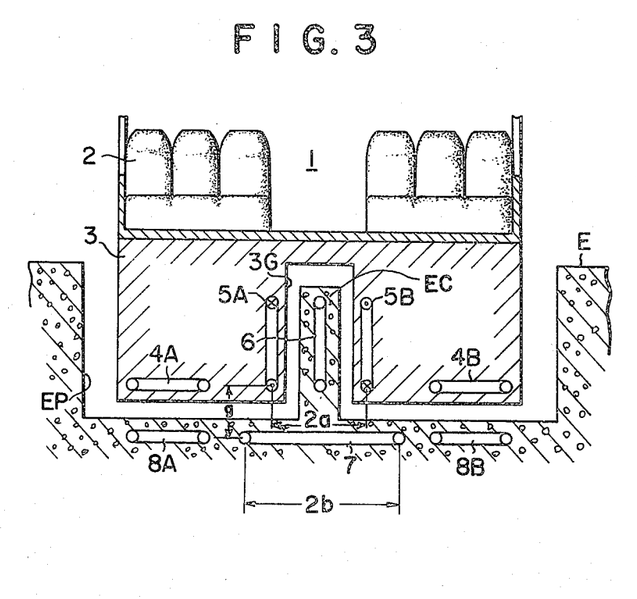
FIG. 3 is a schematic diagram corresponding to a lower part of FIG. 2.

FIGS. 1 to 3 show a magnetically levitated vehicle 1 driven by the linear synchronous motor of this invention. The vehicle 1 comprises a passenger room 2 and a support 3 attached to the bottom of the room 2. The support is provided with a longitudinal hollow or groove 3G at and along the center thereof and with pairs of field coils 4A, 4B and 5A, 5B. These field coils are made of super-conductors and provide a constant magnetic field. Coils 4A and 4B are horizontally mounted at the lower part of support 3 in opposition to each other in relation to the longitudinal center line of groove 3G or of vehicle 1. It will be understood that a plurality of such pairs of field coils are disposed at equal spaces along the length of vehicle 1. On the other hand, field coils 5A and 5B are vertically mounted face to face with each other or with the side walls of groove 3G. Coils 5A and 5B corresponding in the number to that of coils 4A and 4B are provided at the same spaces along the length of the vehicle.

In opposition to the vehicle constructed as described above, a track EP having a protrusion or wall EC at and along the center thereof is provided on ground to guide the running vehicle. The profile of the track corresponds to that of the said vehicle support but with an ample clearance therebetween. Further, track EP is provided with suspending coils 8A and 8B a number of pairs of which are horizontally disposed at equal spaces under and along the path of field coils 4A and 4B. The suspending coil is made of a wound and short-circuited conductor or a sheet of a conductor. Within center wall EC and at equal distance from coils 5A and 5B, are disposed guiding coils 6 which are to serve to maintain the lateral stability of the vehicle. The guiding coil is also made of a closed winding or of a conductive sheet, and a number of such coils are disposed along the track. Along the center line of the track a number of rectangular driving coils 7 are embedded in the horizontal position. It will be understood that the number of field coils 4A, 4B, and 5A, 5B for each vehicle is determined considering such factors as the length, width and weight of the vehicle as well as the capacity of the coils.

With the above-described coil arrangement, the travelling magnetic fields generated by field coils 4A, 4B and 5A, 5B mounted on the running vehicle act with respect to suspending coils 8A, 8B and guiding coils 6 on the ground side so as to provide a suspending force and a guiding force respectively. Further, driving coils 7 are energized with three-phase a.c. power supplied from an external power source to generated a travelling wave of magnetic flux which reacts to the travelling magnetic field by field coils 5A, 5B so as to propel the field coils and hence the vehicle in synchronization with the movement of the magnetic wave by the driving coil. Therefore, by controlling the frequency of the three-phase power energizing the driving coil, the running speed of the vehicle can be controlled.

Figure 4:
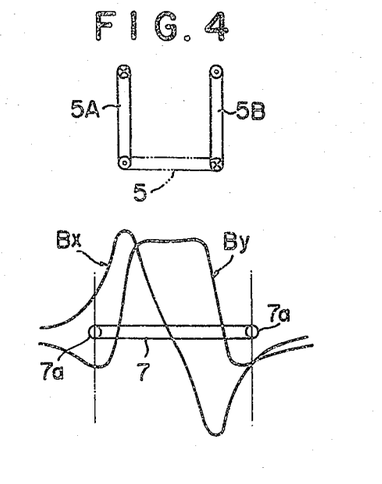
FIG. 4 is a diagram showing the distribution of the magnetic flux in relation to the arrangement of coils shown in FIG. 3.

In this connection, attention should be directed to the fact that the width or lateral length $2b$ of driving coil 7 is made to be larger than the distance between opposing field coils 5A and 5B. Referring to FIG. 4 which shows the horizontal and vertical components of the distribution of the magnetic flux produced in the vicinity of the driving coil by an imaginary horizontal coil 5 constituted by the lower sides of two field coils 5A and 5B, it will be seen that the horizontal flux density $B_x$ at the lateral sides $7a$ of driving coil 7 is smaller than at the corresponding positions of driving coil 7 shown in FIG. 9. Further, it will be noted that the lateral gradient of the vertical flux density $B_y$ at the same positions in the arrangement of FIG. 4 is smaller than and opposite to the corresponding gradient in the case of FIG. 9. Therefore, in the arrangement shown in FIGS. 3 and 4, the vertical attraction and repulsion determined as the product of the current flowing through coil 7 and the magnetic flux density $B_x$ at part $7a$ of driving coil 7 is reduced as compared with the corresponding forces in the case of the known coil arrangement as shown in FIGS. 8 and 9. Moreover, the lateral spring constant determined as the product of the current flowing through coil 7 and the magnetic flux density $B_y$ at part $7a$ is rendered a very small unstable constant or even a stable spring constant.

The above-stated interactions between coils are further studied hereunder by mathematical approach. The horizontal and vertical components $B_x$ and $B_y$ of the magnetic flux density can be expressed by the following formulas:

$$B_x = \frac{\mu_0 I_f}{2\pi} \left\{ \frac{g}{(x-a)^2+g^2} - \frac{g}{(x+a)^2+g^2} \right\} \quad (1)$$

$$B_y = \frac{\mu_0 I_f}{2\pi} \left\{ \frac{x-a}{(x-a)^2+g^2} - \frac{x+a}{(x+a)^2+g^2} \right\} \quad (2)$$

where $\mu_0$ is magnetic permeability of air; $a$ is one half of the lateral width of imaginary field coil 5;
$g$ average distance between driving coil 7 and imaginary field coil 5 during normal running of the vehicle;
$x$ lateral displacement of imaginary field coil 5 from the center position thereof; and $I_f$ magneto-motive force by the imaginary field coil. The longitudinal length of the field coils or imaginary field coil 5 can be deemed as infinite, as it is by far longer than the lateral width $2a$ of imaginary coil 5.

Further defining that $2b$ is the lateral width of driving coil 7, $c$ is the length of the same coil along the length of the track, and $I_n$ is the magneto-motive force by driving coil 7, the maximum values of the driving force and the vertical force (F, T respectively) acting between the driving coil and the field coils, and the maximum value of lateral spring constant (K) are respectively expressed by the following formulas.

$$F = 2 \int_{-b}^{b} B_y I_n dx = \frac{\mu_0 I_f I_n c}{\pi} \log \frac{(b+a)^2+g^2}{(b-a)^2+g^2} \quad (3)$$

-Continued $$T = 2 \int_{0}^{c} B_x I_n dz$$

$$= \frac{\mu_0 I_f I_n c}{\pi} \left\{ \frac{g}{(b-a)^2+g^2} - \frac{g}{(b+a)^2+g^2} \right\} \quad (4)$$

$$K = \frac{d}{dx} 2 \int_{0}^{c} B_y I_n dz$$

$$= \frac{\mu_0 I_f I_n c}{\pi} \left\{ \frac{g^2-(b-a)^2}{[(b-a)^2+g^2]^2} - \frac{g^2-(b+a)^2}{[(b+a)^2+g^2]^2} \right\} \quad (5)$$

In the following paragraphs, the terms "vertical force" and "lateral spring constant" should be understood as references to the respective maximum values of such forces, unless specially defined otherwise.

Figure 5:
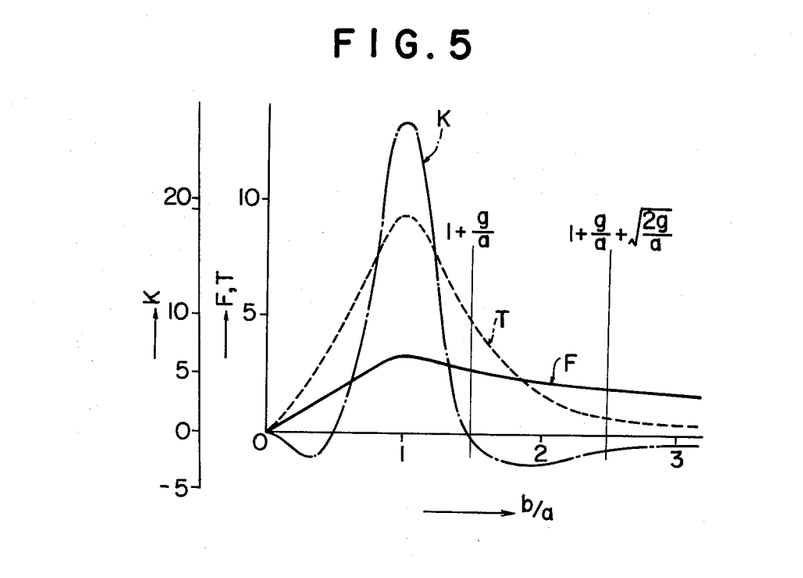
FIG. 5 is a graph showing driving force, vertical force and lateral spring constant respectively as functions of the ratio of the widths of the driving coils to the field coils shown in FIG. 3.

The relations of the ratio of width of driving coil 7 and field coil 5 to the driving force F, vertical force T and lateral spring constant K as determined by the above formulas (3) to (5), are shown in FIG. 5, from which the following three features are seen.

1. The driving force F decreases approximately in proportion to the ratio $b/a$ in the range of this ratio less than 1, whereas it decreases only gradually in the range of ratio $b/a$ larger than 1.

2. The vertical force T steeply decreases as the ratio $b/a$ deviates from 1.

3. The lateral spring constant K assumes a maximum unstable value (magnetic repulsion) in the range where the ratio $b/a$ is near to 1. However, the constant K steeply decreases as the ratio deviates from 1 to eventually become a stable spring constant (magnetic attraction).

It will be understood from the above analysis that though the ratio $b/a$ is preferable to be 1 exclusively from the standpoint of the driving force F, this ratio 1 is also associated with the peak vertical force more than twice as large as the driving force and with the maximum value of the unstable lateral spring constant K which will obstruct any stable running of the vehicle. Namely, for a practical running of the vehicle, some compromise is necessary between the driving force and both of the vertical force and the lateral spring constant. Thus, in designing the system, the driving force is somewhat reduced to keep the vertical force and the lateral spring constant under reasonable levels. It will be clear that the reduction of the driving force may be effected with less difficulty by choosing the ratio $b/a$ in a range more than 1 than choosing a ratio of less than 1, as the gradient of the decrease is more moderate in the former range of the ratio.

Turning to the lateral spring constant, it will be noted that a stable spring constant is obtained by choosing the variables in the above formula (5) to give a negative value of the constant K. As the average coil distance $g$ is a fraction of the width $a$ of the field coil 5, a value $g^2$ is negligible as compared with a value $a^2$ (i.e., $a^2 >> g^2$). Therefore, the condition for the lateral spring constant to be a stable constant is determined from formula (5) and expressed as follows.

$$b \geq a + g \quad (6)$$

As mentioned above, however, the driving force F decreases, though gradually, as the width of driving coil 7 relative to that of field coil 5 increases. Therefore, unlimited increase of the width of driving coil 7 is never practical as it requires an extraordinary increase of the magneto-motive force of the driving coil. From the practical point of view, the allowable decrease of the driving force is assumed to be one half of the peak value corresponding to the ratio $b/a$ of 1, and this condition is determined as follows. Namely, from formula (3);

$$a + g - \sqrt{2ag} \leq b \leq a + g + \sqrt{2ag} \quad (7)$$

Further, from formulas (6) and (7);

$$a + g \leq b \leq a + g + \sqrt{2ag} \quad (8)$$

Therefore, $$1 + \frac{g}{a} \leq \frac{b}{a} \leq 1 + \frac{g}{a} + \sqrt{\frac{2g}{a}} \quad (9)$$

In the range defined by the above condition, as is seen from FIG. 5, the decrease of the vertical force T is more outstanding as compared with the decrease of the driving force F, and moreover the lateral spring constant assumes a negative value which means a stable spring constant. Thus, the reciprocating vertical force, which is obstructive to the stable suspension of the vehicle, is effectively reduced, and vibration of the vehicle accordingly decreases. Further, the stable spring constant acts so as to restore the normal center position of the vehicle whenever the vehicle deviates from the normal position. Therefore, by choosing the ratio within the above-mentioned range, a stable running of the magnetically levitated vehicle which is driven by a linear synchronous motor is achieved.

By way of trial, the above condition is numerically determined as follows, assuming that width ($2a$) of the field coil is 0.8 m and the average distance ($g$) between the field coil and the driving coil is 0.2 during the normal running of the vehicle.

From formula (9);

$$1 + \frac{0.2}{0.4} \leq \frac{b}{0.4} \leq 1 + \frac{0.2}{0.4} + \sqrt{\frac{2 \times 0.2}{0.4}}$$

Therefore $1.5 \leq \frac{b}{0.4} \leq 2.5$

Namely, it is determined that the width ($2b$) of the driving coil should be in the range of 1.2 to 2 m.

Next, another approach for limiting the width of the driving coil is proposed particularly taking the unstable lateral spring constant into consideration. It is assumed, from the practical point of view, that the unstable lateral spring constant K must be reduced to one half of its peak value.

From formula (5), where $a^2 >> g^2$;

$$b \geq a + \frac{1}{2g} \quad (10)$$

Substituting the left side of formula (9) by above formula (10);

$$1 + \frac{g}{2a} \leq \frac{b}{a} \leq 1 + \frac{g}{a} + \sqrt{\frac{2g}{a}} \quad (11)$$

Figure 6:
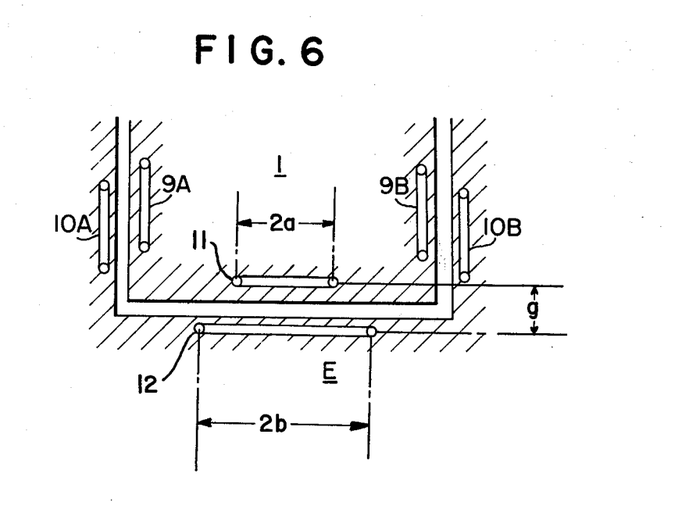
FIGS. 6 and 7 are schematic diagrams respectively showing the essential part of alternative embodiments of the linear synchronous motor of this invention.
Figure 7:
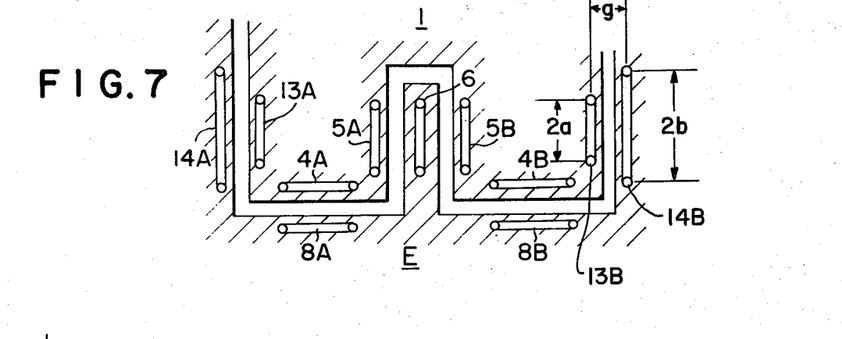

FIGS. 6 and 7 show further embodiments of the linear motor of this invention, which have coil arrangements different from that described above with reference to FIGS. 3 to 5.

In FIG. 6, a pair of field coils 9A, 9B of a super conductor are vertically disposed in both blanks of the support of vehicle 1, while a complementary pair of guiding and suspending coils 10A, 10B are also vertically disposed, on the ground side, approximately opposite to the field coils but slightly displaced to a lower position relative to the field coils. Further, another field coil 11 of a super conductor is horizontally disposed at the bottom and center position of the vehicle support, opposite to which a driving coil 12 is disposed on ground E. It should be noted that the field coil 11 is not an imaginary coil such as coil 5 referred to in connection with the first embodiment, but a real coil. With this coil arrangement too, the reduction of the undesirable vertical force as well as the unstable lateral spring constant or the conversion of the unstable spring constant into a stable constant is attained by choosing the width ($2a$) of field coil 11, the width ($2b$) of driving coil 12 and the average distance ($g$) between coils 11 and 12 according to the connection defined by above formula (9) or formula (11).

In the coil arrangement shown in FIG. 6, there are seen three field coils 9A, 9B and 11 on the vehicle in the presented section and three more coils of guiding and suspending coils 10A, 10B and driving coil 12 on the ground side, making the total number of the coils six in the considered section. In the first embodiment shown in FIG. 3, on the other hand, a section has four vehicle coils and four ground coils, the total number being eight. Therefore, the coil arrangement as shown in FIG. 6 gives a more economical linear synchronous motor than that shown in FIG. 3.

In the embodiment shown in FIG. 7, a pair of driving coils 14A, 14B are vertically disposed on ground side E in opposition to the respective flanks of the support of vehicle 1 and a complementary pair of field coils 13A, 13B are mounted on the vehicle support opposite to the respective driving coils. Further, guiding coil 6 and suspending coils 8A, 8B are mounted on the vehicle support respectivey opposite to additional pairs of field coils 5A, 5B and 4A, 4B. With this arrangement, the operation characteristics of the linear synchronous motor can be improved as the magnetic coupling between the coils on board and the ground coils can be individually designed for each coil group. In this connection, it will be recalled that in the embodiment shown in FIG. 3, field coils 5A, 5B are magnetically coupled with both the guiding coil 6 and the driving coil 7.

It will be understood that the electromagnetical relation between field coils 13A, 13B and driving coils 14A, 14B in the embodiment shown in FIG. 7, is identical to that in the embodiment shown in FIG. 6, and the condition expressed by formula (9) or (11) must be observed also in this case.

In the above embodiments, driving coils having a width larger than that of the opposing field coil are used. However, it is quite possible to choose the width of the driving coil to be smaller than that of the opposing field coil. In this case too, the condition for suitable running is obtained by similar procedure and is expressed by the following formula:

$$1 + \frac{g}{2b} \leq \frac{a}{b} \leq 1 - \frac{g}{b} + \sqrt{\frac{2g}{b}}$$

What we claim is:

1. In a magnetically levitated vehicle which includes a linear synchronous motor having field coils on the vehicle for generating a constant magnetic field and driving coils disposed on the ground and opposite to the path of said field coils, the improvement wherein the ratio of the width of said driving coils to the width of said field coils is chosen so as to fall in the range expressed by the following formula, where $2a$ is the width of said field coils, $2b$ is the width of said driving coils, and $g$ is the average distance between the paths of said field coils and said driving coils in the normal running of the vehicle:

$$1 + \frac{g}{2a} \leq \frac{b}{a} \leq 1 + \frac{g}{a} + \sqrt{\frac{2g}{a}}$$

2. The improvement as defined in claim 1, wherein said field coils are horizontally disposed in the lower center portion of the vehicle and wherein at least a pair of field coils are vertically disposed in both the lower side portions of the vehicle and in parallel to the longitudinal vertical center plane of the vehicle and a pair of guiding and suspending coils are vertically disposed on the ground side approximately opposite to the paths of said pair of field coils but being displaced to a slightly lower position.

3. In a magnetically levitated vehicle which includes a linear synchronous motor having field coils on the vehicle for generating a constant magnetic field and driving coils on the ground and opposite to the path of said field coils, the improvement wherein the ratio of the width of said driving coils to the width of said field coils is chosen so as to fall in the range expressed by the following formula, where $2a$ is the width of said field coils, $2b$ is the width of said driving coils, and $g$ is the average distance between the paths of said field coils and that of said driving coils in the normal running of the vehicle:

$$1 + \frac{g}{a} \leq \frac{b}{a} \leq 1 + \frac{g}{a} + \sqrt{\frac{2g}{a}}$$

4. In a magnetically levitated vehicle which includes a linear synchronous motor having at least one pair of field coils on the vehicle for generating a constant magnetic field and driving coils disposed on the ground and opposite to the path of an imaginary field coil constituted by portions of said pair of field coils, the improvement wherein the ratio of the width of said driving coils to the width of said imaginary field coil is chosen so as to fall in the range expressed by the following formula, where $2a$ is the width of said imaginary field coil, $2b$ is the width of said driving coils, and $g$ is the average distance between the paths of said field coils and said driving coils in the normal running of the vehicle:

$$1 + \frac{g}{2a} \leq \frac{b}{2a} \leq 1 + \frac{g}{a} + \sqrt{\frac{2g}{a}}$$

5. The improvement as defined in claim 4, wherein said field coils are disposed near the lower center portion of the vehicle and positioned vertically and opposite to each other in relation to the longitudinal vertical center plane of the vehicle, guiding coils being vertically disposed on the ground side so as to be positioned between the paths of said pair of field coils, and at least another pair of field coils are horizontally disposed in the lower side portions of the vehicle and opposite in relation to the longitudinal center line of the vehicle, a corresponding pair of suspending coils being disposed on the ground horizontally and respectively opposite to the paths of said another pair of field coils.

6. In a magnetically levitated vehicle which includes a linear synchronous motor having at least one pair of field coils on the vehicle for generating a constant magnetic field and driving coils disposed on the ground and opposite to the path of an imaginary field coil constituted by portions of said pair of field coils, the improvement wherein the ratio of the width of said driving coils to the width of said imaginary field coil is chosen so as to fall in the range expressed by the following formula, where $2a$ is the width of said imaginary field coil, $2b$ is the width of said driving coils, and $g$ is the average distance between the paths of said field coils and said driving coils in the normal running of the vehicle:

$$1 + \frac{g}{a} \leq \frac{b}{a} \leq 1 + \frac{g}{a} + \sqrt{\frac{2g}{a}}$$

7. In a magnetically levitated vehicle which includes a linear synchronous motor having at least one pair of field coils on the vehicle for generating a constant magnetic field and driving coils disposed on the ground and opposite to the path of an imaginary field coil constituted by portions of said pair of field coils, the improvement wherein the ratio of the width of said driving coils to the width of said imaginary field coil is chosen so as to fall in the range expressed by the following formula, where $2a$ is the width of said imaginary field coil, $2b$ is the width of said driving coils, and $g$ is the average distance between the paths of said field coils and said driving coils in the normal running of the vehicle:

$$1 + \frac{g}{2b} \leq \frac{a}{b} \leq 1 + \frac{g}{b} + \sqrt{\frac{2g}{b}}$$

8. The improvement as defined in claim 7, wherein said field coils are disposed near the lower center portion of the vehicle and positioned vertically and opposite to each other in relation to the longitudinal vertical center plane of the vehicle, guiding coils being vertically disposed on the ground side so as to be positioned between the paths of said pair of field coils, and at least another pair of field coils are horizontally disposed in the lower side portions of the vehicle and opposite in relation to the longitudinal center line of the vehicle, a corresponding pair of suspending coils being disposed on the ground horizontally and respectively opposite to the paths of said pair of field coils.

9. In a magnetically levitated vehicle which includes a linear synchronous motor having at least one first pair of field coils disposed near the lower center portion of the vehicle and positioned vertically and opposite to each other in relation to the longitudinal vertical center plane of the vehicle, at least one second pair of field coils horizontally disposed in the lower side portions of the vehicle and opposite in relation to the longitudinal center line of the vehicle and at least one third pair of field coils vertically disposed in both the lower side portions of the vehicle in parallel to the longitudinal vertical center plane of the vehicle, guiding coils being vertically disposed on the ground side so as to be positioned between the paths of said first pair of field coils, a pair of suspending coils being disposed on the ground horizontally and respectively opposite to the paths of said second pair of field coils, and a pair of driving coils being disposed on the ground vertically and respectively opposite to the paths of said third pair of field coils, the improvement wherein the ratio of the width of said driving coils to the width of said third field coils is chosen so as to fall in the range expressed by the following formula, where $2a$ is the width of said third field coils, $2b$ is the width of said driving coils, and $g$ is the average distance between the paths of said third field coils and said driving coil in the normal running of the vehicle:

$$1 + \frac{g}{2a} \leq \frac{b}{a} \leq 1 + \frac{g}{a} + \sqrt{\frac{2g}{a}}.$$

10. In a magnetically levitated vehicle which includes a linear synchronous motor having at least one first pair of field coils disposed near the lower center portion of the vehicle and positioned vertically and opposite to each other in relation to the longitudinal vertical center plane of the vehicle, at least one second pair of field coils horizontally disposed in the lower side portions of the vehicle and opposite in relation to the longitudinal center line of the vehicle and at least one third pair of field coils vertically disposed in both the lower side portions of the vehicle in parallel to the longitudinal vertical center plane of the vehicle, guiding coils being vertically disposed on the ground side so as to be positioned between the paths of said first pair of field coils, a pair of suspending coils being disposed on the ground horizontally and respectively opposite to the paths of said second pair of field coils, and a pair of driving coils being disposed on the ground vertically and respectively opposite to the paths of said third pair of field coils, the improvement wherein the ratio of the width of said driving coils to the width of said third field coils is chosen so as to fall in the range expressed by the following formula, where $2a$ is the width of said third field coils, $2b$ is the width of said driving coils, and $g$ is the average distance between the paths of said third field coils and said driving coils in the normal running of the vehicle:

$$1 + \frac{g}{2b} \leq \frac{a}{b} \leq 1 + \frac{g}{b} + \sqrt{\frac{2g}{b}}.$$

11. In a magnetically levitated vehicle which includes a linear synchronous motor having field coils on the vehicle for generating a constant magnetic field and driving coils disposed on the ground and opposite to the path of said field coils, the improvement wherein the ratio of the width of said driving coils to the width of said field coils is chosen so as to fall in the range expressed by the following formula, where $2a$ is the width of said field coils, $2b$ is the width of said driving coils, and $g$ is the average distance between the paths of said field coils and said driving coils in the normal running of the vehicle:

$$1 + \frac{g}{2b} \leq \frac{a}{b} \leq 1 + \frac{g}{b} + \sqrt{\frac{2g}{b}}$$

wherein said field coils are horizontally disposed in the lower center portion of the vehicle and wherein a pair of field coils are vertically disposed in either of the lower side portions of the vehicle and in parallel to the longitudinal vertical plane of the vehicle and a pair of guiding and suspending coils are vertically disposed on the ground side approximately opposite to the paths of said pair of field coils but being displaced to a slightly lower position.

* * * * *